United States Patent [19]
Buisman

[11] Patent Number: 5,196,176
[45] Date of Patent: Mar. 23, 1993

[54] PROCESS FOR THE REMOVAL OF SULFUR DIOXIDE FROM WASTE GAS

[75] Inventor: Cees J. N. Buisman, Harich, Netherlands

[73] Assignee: Paques, B.V., Balk, Netherlands

[21] Appl. No.: 688,995

[22] Filed: Apr. 12, 1991

[30] Foreign Application Priority Data

Apr. 12, 1990 [NL] Netherlands .......................... 9000876

[51] Int. Cl.$^5$ .......................... C01B 17/00; C02F 3/00
[52] U.S. Cl. ............................ 423/242.2; 423/573.1; 210/603
[58] Field of Search ............ 423/242 A, 573.1, 242 R; 210/603

[56] References Cited

U.S. PATENT DOCUMENTS 4,839,052 6/1989 Maree .

FOREIGN PATENT DOCUMENTS 0306431 3/1989 European Pat. Off. .
0326457 8/1989 European Pat. Off. .
3621333 1/1988 Fed. Rep. of Germany .
8801009 11/1989 Netherlands .

OTHER PUBLICATIONS

"Biological Sulphate Removal in an Upflow Packed Bed Reactor", *Water Research*, vol. 19, No. 9, 1985, by J. P. Maree et al., pp. 1101–1106.

Primary Examiner—Gregory A. Heller
Attorney, Agent, or Firm—Young & Thompson

[57] ABSTRACT

The invention provides a process for the removal of sulfur dioxide from waste gas, comprising the steps of:
a) contacting the waste gas with a basic aqueous solution wherein sulfur dioxide is dissolved as sulfite;
b) subjecting the aqueous solution containing sulfite to sulfur reducing bacteria in an anaerobic reactor wherein sulfite is reduced to sulfide;
c) subjecting the aqueous solution containing sulfide to sulfur oxidizing bacteria in the presence of a limiting amount of oxygen in a reactor wherein sulfide is oxidized to elemental sulfur;
d) separating the elemental sulfur form the aqueous solution; and
e) recycling the aqueous solution to step a).

4 Claims, 1 Drawing Sheet

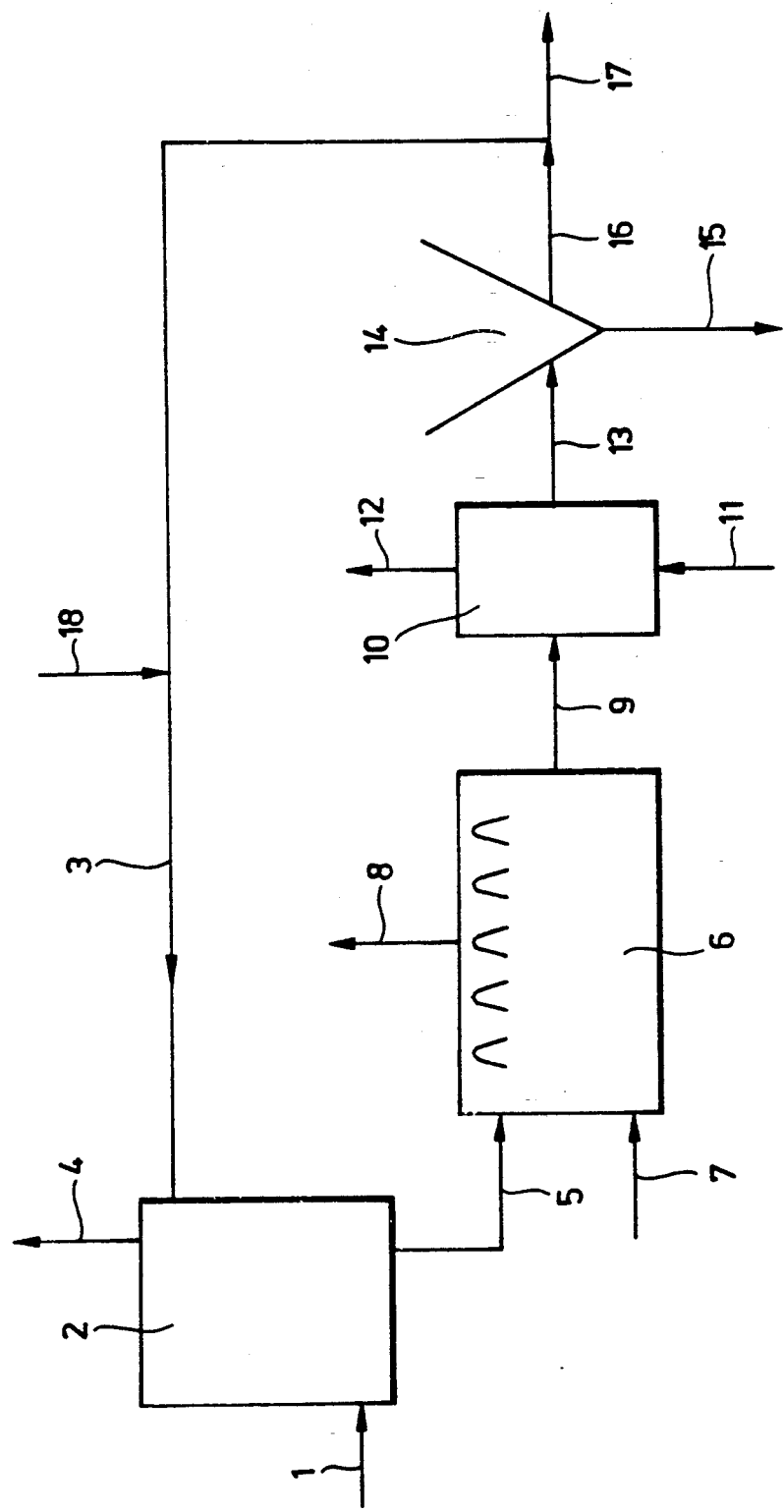

PROCESS FOR THE REMOVAL OF SULFUR DIOXIDE FROM WASTE GAS

BACKGROUND OF THE INVENTION

The invention relates to a process for the removal of sulfur dioxide from waste gas.

Gaseous effluents from oil-fired or coal-fired power stations and waste incinerators contain various amounts of sulfur dioxide ($SO_2$) which are detrimental to man and the environment (acid rain).

Existing processes for the desulfurization of waste gases can be divided into wet processes, spray-dry processes and dry processes.

In wet processes, the waste gases are contacted with an aqueous solution or suspension wherein the sulfur dioxide is dissolved. In order to sufficiently bind the sulfur dioxide in the aqueous solution, the solution must be alkaline. Known processes use limestone, alkali or ammonia as the source of alkalinity.

Desulfurization of waste gases has often been effected by washing the sulfur dioxide from the gases using lime. This results in large amounts of gypsum, the utilization of which is becoming increasingly difficult since the quality requirements of gypsum become more stringent. In a process using ammonia (often referred to as ammonium sulfate process), sulfur dioxide is washed from the waste gas with an ammonia solution which eventually leads to the production of ammonium sulfate which may be used as a chemical fertilizer.

In a spray-dry process, a finely divided lime suspension is blown into an absorber, wherein the sulfur dioxide reacts with the lime to form a mixture of calcium sulfite and sulfate. The amount of water used is sufficiently low to avoid the production of waste water. However, the problem of disposing the mixture of calcium sulfite/calcium sulfate/fly ash has not been solved. Dry processes have not been used in practice, largely because of the very high costs. Such processes produce a concentrated gaseous flow of sulfur dioxide.

An important alternative process for the processes mentioned above is the reduction of the sulfur dioxide by biological processes. Biological reactors have advantages in that they use a relatively simple technology under moderate pressure and temperature conditions.

SUMMARY OF THE INVENTION

It is an object of the present invention to provide a process for the removal of sulfur dioxide from waste gases by biological methods.

A further object of the invention is to provide a process for the removal of sulfur dioxide from waste gases, wherein the sulfur dioxide is converted into a sulfur species that can be easily separated and re-used.

A further object of the invention is to provide a process for the removal of sulfur dioxide from waste gas having low energy requirements.

Another object of the invention is to provide a process for the removal of sulfite from waste water wherein the sulfite is converted into a sulfur species that can be separated and re-used.

These and other objects are achieved by a process for the removal of sulfur dioxide from waste gas, comprising the steps of:
a) contacting the waste gas with a basic aqueous solution wherein sulfur dioxide is dissolved as sulfite;
b) subjecting the aqueous solution containing sulfite to sulfur reducing bacteria in an anaerobic reactor wherein sulfite is reduced to sulfide;
c) subjecting the aqueous solutions containing sulfide to sulfur oxidizing bacteria in the presence of a limiting amount of oxygen in a reactor wherein sulfide is oxidized to elemental sulfur;
d) separating the elemental sulfur form the aqueous solution; and
e) recycling the aqueous solution to step a).

When the sulfur dioxide is present in an aqueous effluent rather than a gaseous effluent, the process comprises the steps of:
a) optionally adjusting the concentration and the pH in the waste water to obtain an aqueous solution containing sulfite;
b) subjecting the aqueous solution containing sulfite to sulfur reducing bacteria in an anaerobic reactor wherein sulfite is reduced to sulfide;
c) subjecting the aqueous solution containing sulfide to sulfur oxidizing bacteria in the presence of a limiting amount of oxygen in a reactor wherein sulfide is oxidized to elemental sulfur; and
d) separating the elemental sulfur from the aqueous solution.

BRIEF DESCRIPTION OF THE DRAWING

The FIGURE of the accompanying drawings schematically depicts an apparatus for carrying out the process of the present invention for the removal of sulfur dioxide from gaseous effluents.

DETAILED DESCRIPTION OF THE INVENTION

In the present specification and claims, "sulfite" is to be understood as to comprise any oxygen compound of tetravalent sulfur, such as sulfite ($SO_3^{2-}$), bisulfite ($HSO_3^-$), metabisulfite ($S_2O_5^{2-}$), dissolved sulfur dioxide ($SO_2$), sulfurous acid ($H_2SO_3$) etc.

A "solution containing sulfite" may additionally contain minor amounts of other sulfur components, such as sulfate, thiosulfate etc.

A "waste gas containing sulfur dioxide" is understood to contain sulfur dioxide as the main sulfur pollutant; minor amounts of other sulfur components, such as sulfur trioxide, may also be present and are removed equally well by the process of the present invention.

For the purpose of the present invention, sulfide is understood to comprise all inorganic ionic or non-ionic species of divalent sulfur such as sulfide ($S^{2-}$), hydrosulfide ($HS^-$), hydrogen sulfide ($H_2S$) and the corresponding polysulfide species.

An electron donor is necessary for the biological reduction of sulfur dioxide to sulfide. Suitable electron donors include hydrogen, carbon monoxide, organic substances and mixtures thereof. Examples of organic substances are alcohols, fatty acids, esters, sugars, starches, organic waste, etc. Such electron donors are largely converted into acetate upon anaerobic treatment by sulfur reducing bacteria.

The reaction steps occurring in the process according to the invention can be represented in a simplified manner by the following equation, wherein carbon monoxide and hydrogen are used as electron donors:

$$SO_2 + H_2O \longrightarrow H_2SO_3 \quad \text{(gas scrubber)}$$

-continued $$H_2SO_3 + 3CO \longrightarrow H_2S + 3CO_2 \quad \text{(anaerobic reactor)}$$

$$H_2SO_3 + 3H_2 \longrightarrow H_2S + 3H_2O \quad \text{(anaerobic reactor)}$$

$$H_2S + \tfrac{1}{2}O_2 \longrightarrow S + H_2O \quad \text{(sulfide reactor)}$$

Suitable bacteria for use in the anaerobic reactor to reduce sulfite to sulfide include especially sulfur reducing bacteria, such as species of the genera Desulfovibrio, Desulfotomaculum, Desulfomonas, Desulfobulbus, Desulfobacter, Desulfococcus, Desulfonema, Desulfosarcina, Desulfobacterium and Desuloromas. In general, these bacteria are available from various anaerobic cultures and/or grow spontaneously in the anaerobic reactors.

Suitable bacteria for use in the sulfide oxidizing reactor include colorless sulfur bacteria, for example of the genera Thiobacillus, Thiomicrospira, Sulfolobus and Thermothrix.

In order to achieve a partial oxidization in the sulfide oxidizing reactor to essentially produce elemental sulfur rather than higher oxidized sulfur species such as sulfate, the amount of oxygen that is introduced in the sulfide reactor is limited and/or the retention time of the aqueous solution containing sulfide in the sulfide reactor is kept sufficiently short. The amount of oxygen is preferably limited by adding oxygen in an amount of 0.5 to 1.5 moles of oxygen per mole of sulfide. The oxygen supply can be controlled e.g. by controlling the oxygen concentration in the reactor with reference to the sulfide concentration. As an alternative, the oxygen supply can be controlled in relation to the redox potential of the aqueous solution in the reactor or in the reactor effluent. The hydraulic retention time can e.g. be selected as 20 minutes or less. The pH in the sulfide oxidizing reactor is not critical. It may be from slightly basic to neutral to acidic. Preferably, the pH does not exceed about 9. The sulfur oxidizing bacteria may be present as such, or they may be immobilized, for example on a polymeric support.

The elemental sulfur that is produced in the sulfur oxidizing reactor can be separated from the aqueous solution by filtration, centrifugation, flocculation, settling, etc. After separation, the sulfur may be further purified and/or re-used.

The process of the invention is advantageous in that it produces reusable sulfur, and does not require complicated and/or expensive technology. Furthermore it results in considerably reduced costs for waste gas desulfurization.

Another advantage is that fly ash is removed from the waste gas as well and can be separated as a solid, together with the elemental sulfur, or in a separate step. Furthermore, any heavy metals that may be present in the gaseous or aqueous waste flow precipitate as metal sulfite in the anaerobic reactor and are not discharged into the environment. p The essential steps of the present invention, i.e. microbiological reduction of sulfite in an aqueous solution to produce sulfide and partial microbiological oxidation to produce sulfur, may also be used according to the invention in a process for the removal of sulfite from waste water. In case such waste water also contains organic waste, the addition of an electron donor or other nutrients may not be necessary.

The process of the invention is further illustrated with reference to the accompanying figure.

According to the figure, waste gas contaminated with sulfur dioxide is introduced at 1 into a gas scrubber 2. In the gas scrubber, the waste gas is treated in counter-current with a washing liquid that is introduced from 3. The treated waste gas is discharged through 4 or may be purified further. The washing liquid that has absorbed the sulfite is conducted through 5 and fed to an anaerobic reactor tank 6. An electron donor such as ethanol, and optional other components such as nutrient elements, buffering agents, etc. are introduced at 7 into the anaerobic reactor 6. Gases that are produced in the anaerobic reactor, mainly $CO_2$ in addition to minor amounts of $H_2S$, are conducted from the anaerobic tank through conduct 8 to a gas treatment plant (not shown). The anaerobic effluent is conducted through 9 to an aerobic or partially aerobic reactor 10. Air is introduced into the aerobic reactor 10 through 11 and excess air is removed through 12. The aerobic effluent containing elemental sulfur is conducted through 13 to a settling tank 14. The elemental sulfur and optionally other solid components are allowed to settle in tank 14 and drained off through conduct 15. The clarified solution leaves the separator through 16 and can be re-used as washing liquid. If necessary, a surplus of the clarified solution is discharged through 17. Additional washing liquid, optionally containing pH regulators and nutrient elements, can be added through 18 to the recycled washing liquid in 3.

When used in a conventional coal-fired power plant having the production characteristics as shown in table A, the main gaseous and aqueous flows and the content of the relevant components according to the process of the invention are approximately as follows (the numbers referring to the figure):

| | | |
|---|---|---|
| 1. | Untreated waste gas: | $1.7 \cdot 10^6$ m$^3$/h |
| 5. | Washing liquid containing sulfite (1 g S/l): | 2000 m$^3$/h |
| 7. | Ethanol: | 1,500 tons/h |
| 6. | Anaerobic reactor: | 21,000 m$^3$ |
| 8. | Anerobic gas: | ±80% CO$_2$, ±20% H$_2$S |
| 9. | Anaerobic effluent: | ca. 800 mg S$^{2-}$/l |
| 10. | Sulfide reactor: | 4000 m$^3$ |
| 11. | Aeration: | 50,000 m$^3$/h |
| 13. | Sulfide reactor effluent: | ca. 800 mg S$^0$/l |
| 14. | Sulfur settling tank: | 2000 settling plates, 1 m$^3$/plate |
| 15. | Sulfur slurry: | 1.6 ton S$^0$/h |
| 16. | Clarified recycling solution: | 2000 m$^3$/h. |

Estimated capital outlay for the introduction of a waste gas desulfurization system according to the invention in a power plant as described above is about Dfl 80,000,000 ($40,000,000), compared with about Dfl. 160,000,000 for a corresponding conventional desulfurization system (Measuring Programm for Waste Gas Desulfurization, NOVEM, EPON, Zwolle, The Netherlands, Dec. 12, 1988); running costs of the system of the invention are estimated at Dfl. 20,000,000 ($10,000,000) a year, compared with Dfl. 36,000,000 a year for a conventional system.

TABLE A

| | |
|---|---|
| plant power | 600 MW |
| waste gas production | 1,668,300 Nm$^3$/h |
| sulfur content of coal | 0.7% |
| SO$_2$ | 2000 kg/h |

TABLE A-continued

| CO$_2$ | 415 tons/h |
|---|---|

I claim:

1. A process for the removal of sulfur dioxide from waste gas, comprising the steps of:
   a) contacting the waste gas with a basic aqueous solution wherein sulfur dioxide is dissolved as sulfite;
   b) subjecting the aqueous solution containing sulfite to sulfur reducing bacteria in an anaerobic reactor wherein sulfite is reduced to sulfide;
   c) subjecting the aqueous solution containing sulfide to sulfur oxidizing bacteria in the presence of a limiting amount of oxygen ranging from about 0.5 to 1.5 moles of oxygen per mole of sulfide in a reactor wherein sulfide is oxidized to elemental sulfur;
   d) separating the elemental sulfur from the aqueous solution; and
   e) recycling the aqueous solution to step a).

2. The process of claim 1, wherein an electron donor selected from the group consisting of hydrogen, carbon monoxide, alcohols, fatty acids, esters, sugars, starches, organic waste and mixtures thereof, is added to the aqueous solution before step b).

3. The process of claim 2, wherein the electron donor is an alcohol and comprises ethanol.

4. A process for the removal of sulfite from waste water, comprising the steps of:
   a) adjusting the concentration and the pH in the waste water to obtain an aqueous solution containing sulfite;
   b) subjecting the aqueous solution containing sulfite to sulfur reducing bacteria in an anaerobic reactor wherein sulfite is reduced to sulfide;
   c) subjecting the aqueous solution containing sulfide to sulfur oxidizing bacteria in the presence of a limiting amount of oxygen ranging from about 0.5 to 1.5 moles of oxygen per mole of sulfide in a reactor wherein sulfide is oxidized to elemental sulfur; and
   d) separating the elemental sulfur from the aqueous solution.

* * * * *